3,341,357
DEGRADABLE POLYOLEFIN MULCHING FILM HAVING OPAQUE COATING
George B. Feild, New Castle, Del., assignor to Hercules Incorporated, a corporation of Delaware
No Drawing. Filed June 25, 1964, Ser. No. 378,057
5 Claims. (Cl. 117—138.8)

ABSTRACT OF THE DISCLOSURE

Opaque polyolefin mulching film which degrades upon exposure to outdoor weathering is produced by applying an adherent opaque coating to the undersurface of transparent polyolefin film. The use of a prodegradant, as, for example, a polyterpene resin in the polyolefin, is optional and provides further control over the rate of degradation during use.

---

This invention relates to plastic mulching film and, more particularly, to a mulching film which is degradable.

Plastic in sheet or film form has been found to be a practical material for protecting plants and their roots from cold, heat and drought, for controlling weeds, for retaining moisture in the ground and for keeping fruits and vegetables clean. Plastic films have also been used to alter the climate of the seed zone and to reduce surface crusting, thereby improving seed germination and seedling emergence. Such films, which are available in colors from black to clear, cause marked changes in the temperature and moisture conditions of the covered soil, particularly in the surface portion of the profile. They also affect the amount of light reaching the soil surface, the amount of light passing through the film varying from zero in black to almost complete transmission with clear film. For many uses, the absence of light is desirable, as to prevent weed growth, to control soil temperature in hot southerly climates, and the like.

A serious drawback in the commercial acceptance of agricultural films concerns the problem of removing, picking up, and disposing of the film after it has served its purpose. Although techniques such as hand raking and burning, triple discing the film to chop it up and then plowing under, or flame treatments using flame throwers to pick up and burn the film have been tried, the film does not cut or burn easily, and binds up tools and machinery so that the problem of film disposal and litter is very troublesome and costly. Additionally, the presence of chopped-up film in the soil after harvesting endangers future crops by interfering with normal root growth.

Now, in accordance with the present invention, it has been discovered that an opaque mulching film can be produced which will degrade at a controllable rate under conditions of use, i.e., upon exposure to outdoor weathering. Such a film, which is free of the pickup and disposal problems of the prior art mulching films, can thus be used advantageously for many crops which were not previously amenable to plastic mulching.

Accordingly, the present invention is directed to a degradable agricultural mulching film comprising a transparent film of a polyolefin having on its undersurface an adherent opaque coating which prevents transmission of light from the upper surface of the film through the coating.

The opaque film of the present invention degrades upon exposure to outdoor weathering conditions at a predictable rate dependent upon a number of factors, the most important of which include the particular polyolefin employed, geographical location, and climatic conditions during use. An even further control of the rate of degradation can be achieved by incorporating into the polyolefin from which the film is formed an additive capable of promoting degradation of the polyolefin film upon exposure to outdoor weathering. The use of such an additive or prodegradant is an optional embodiment of the invention.

Any polymer of a mono-olefin having at least 2 carbon atoms can be used to form the transparent film of the present invention. The polymer can be either a homopolymer or copolymer or a blend or alloy thereof with minor amounts of other film-forming materials. Particularly suitable are homopolymers or copolymers of ethylene, propylene, butene-1, pentene-1, 3-methyl butene-1, 4-methyl pentene-1, and the like.

The polyolefin is formed into a film (of any desired thickness) by conventional methods, as, for example, by extrusion of the molten material into tube or cast film, by casting a solution of the polymer in a suitable solvent onto a rotating drum, or by similar methods. The thickness of the film may vary over a wide range, and for practical purposes should be of sufficient thickness to afford a good ground cover without being subject to rupture or tearing by laying equipment or the elements, but for purposes of economy should not be unduly thick. Ordinarily, film ranging from about 0.3 to about 5 mils, and preferably from about 0.5 to about 2 mils, thick will be sufficient for most purposes.

The transparent film of the polyolefin will have on its undersurface an adherent coating which prevents transmission of light from the upper surface of the film through the coating. This coating may be of any opaque film-forming material which will form a continuous adherent coating on the polyolefin surface. Particularly suitable for this purpose are the conventional polyamide black printing inks, black pigmented amorphous polymers of mono-α-olefins, and the like. The thickness of the coating likewise is not important and may vary within relatively wide limits, such as from about 0.005 mil to about 1 mil, and preferably from about 0.01 mil to about 0.30 mil, provided, of course, that the continuous coating is sufficiently opaque to prevent transmission of light from the film through the coating.

Polyolefin film which contains no additives has relatively poor stability to the deleterious effects of light and heat, and within a predictable time in the presence of sunlight and heat degrades to the extent that the film becomes dark, hard and brittle, and eventually breaks or crumbles into small particles. In Florida, where the days are usually warm and sunny, the degradation will be much faster than in a more northerly climate having a lower average temperature and a higher degree of cloud cover. Other factors such as the amount of rainfall and the amount of oxygen or other gases present in the atmosphere contribute to the rate of degradation or deterioration of polyolefin film exposed to outdoor weathering. Although it is possible without the use of additives to produce a polyolefin film which will degrade within a specified period of time under certain conditions, the normal rate of deterioration or degradation is not adequate to provide disintegration of the film within a time period appreciably less than one growing season, as, for example, soon after the seedlings have formed but before the roots have set, when transplanting or thinning is required, mid-season for extensive spraying or fertilization for second crop planting or crop rotation, or for similar reasons. Therefore, an optional embodiment of the invention compises using as the transparent film-forming material a polyolefin which contains an additive capable of promoting degradation of the polyolefin film at a controllable rate upon exposure to outdoor weathering. The use of such an additive is not necessary for attaining the advantages of the invention but makes it possible to attain further increases in the range and/or control of the degradation reaction.

Various materials are known which become activated to catalysts in the presence of light and/or heat and act to promote the degradation of polymers containing them upon exposure to weathering. Any material of this type which does not adversely affect the other desirable properties of the film is useful within the scope of the present invention. Materials particularly suitable as additives include unsaturated hydrocarbons, unsaturated resinous materials such as nonhydrogenated polyterpenes, unsaturated coal tar by-products such as coumarone-indene resins, rosin and the like.

The amount of additive employed can vary within wide limits and, for a given use, can be predetermined by taking into account such factors as the particular additive and polyolefin, geographical location, slope of land to be covered, growing season of crop, and the like. Ordinarily, an amount ranging from about 1 to about 50% by weight of the polymer, and preferably from about 3 to about 35%, is adequate.

The additive can be incorporated into the polymer by any of the techniques known for blending a solid or a liquid with a polymer prior to formation into film. For example, the desired amount of additive can be dry blended with the polymer, or the additive in solution or dispersion can be admixed with a solution or dispersion of the polymer in a suitable solvent.

In addition to the additive mentioned above, it is to be understood that other materials such as plasticizers, fertilizer components, insecticides, fungicides and the like can be incorporated into the film, if desired.

The invention will be illustrated by the following examples in which parts and percentages are by weight unless otherwise specified.

*Examples 1–4*

In these examples coated film samples were prepared by compression molding high and low density polyethylene and polypropylene into molding powders, with and without, as additive, 30% by weight of the mixture of a polyterpene resin having a melting point of 125–135° C. (Hercules drop method) and an iodine value of 150–170, pressing into sheets 5-mil thick, and then manually coating one side of the sheet with a black ink having the following composition:

| | Parts |
|---|---|
| Dilinoleic acid-ethylene diamine condensate (ball and ring softening point of 129° C.) | 150 |
| Industrial ethanol | 150 |
| Lampblack (blue tone) | 15 | to give a coating thickness after drying of about 0.2 mil. Four-inch squares cut from these sheets, coated side down, were fastened onto pieces of white cardboard and exposed to outdoor weathering on a fence in Wilmington, Del., at a 60° angle to the horizontal, facing south in May. During the outdoor exposure, the development of brittleness in each strip was observed by periodically examining the strip and noting the time elapsed until it became brittle, the embrittlement point being the time elapsed until a strip breaks apart when tapped at room temperature with the finger. Control samples were prepared and exposed in the same manner except that the compression molded sheets were not coated with the ink. Details as to the film composition and exposure data are tabulated below.

| Example | Film Material | Embrittlement Time (weeks) |
|---|---|---|
| 1 | LDPE [1] | 13–17 |
| Control | LDPE [1] | 17 |
| 2 | HDPE [2] | 17 |
| Control | HDPE [2] | 17 |
| 3 | Polypropylene [3] | 7 |
| Control | do | 7 |
| 4 | Polypropylene, plus 30% polyterpene [4] | 2–3 |
| Control | do | 2–3 |

[1] Low density polyethylene having a density of 0.925.
[2] High density polyethylene having a density of 0.945.
[3] Polypropylene having a birefringent melting point of about 168° C. and a reduced specific viscosity of 2.5 (measured on a 0.1% solution of decahydronaphthalene at 135° C.).
[4] A blend of 70 parts of the polypropylene of (3) and 30 parts polyterpene resin.

From the above it is seen that films can be produced which will degrade on outdoor exposure within a time period as short as 2–3 weeks up to about 4 months and that the presence of an opaque coating on the underside of the film does not interfere with the rate of degradation.

*Examples 5–7*

Film samples were also prepared by extruding into film 1–3 mils thick the low density polyethylene (LDPE) of Example 1 and the polypropylene of Example 3 with and without as additive 10% by weight of the mixture of the polyterpene of Example 4, and then manually coating one side of the film with the ink of Examples 1–4 diluted 50% with isopropanol to give a coating thickness after drying of 0.2 mil. The coated films were trimmed to about 14″ width and laid coating side down next to rows of corn at a distance of 6″ from the corn in May, ten days after seed planting, in a field at Wilmington, Del. The films were anchored by burying the outer 2″ edge of the film in the ground. The embrittlement on outdoor exposure was evaluated as in Examples 1–4. Details as to the film composition and exposure data are tabulated below.

| Ex. | Film Material | Film Thickness (mils) | Embrittlement Time (weeks) |
|---|---|---|---|
| 5 | LDPE | 3.5 | 13 |
| 6 | Polypropylene | 1.0 | 3 |
| 7 | Polypropylene plus 10% polyterpene | 1.0 | 1.3 |

During the growing season visual observations were also made as to the extent of crop and weed growth, soil compaction and erosion, soil temperature and moisture content of the soil in areas covered with the coated film as compared with areas which had not been covered. In all cases during the life of the film, the soil beneath the film was hotter and higher in moisture content than soil areas which were not covered. Use of the film of Example 5 gave a crop yield equal to or better than when no film was used with the attendant advantage that there was no weed problem.

What I claim and desire to protect by Letters Patent is:
1. A degradable agricultural mulching film comprising a transparent film of a polyolefin having on its undersurface an adherent opaque coating which prevents transmission of light from the upper surface of the film through the coating, said opaque coating consisting essentially of opaque pigment and binder.
2. The degradable film of claim 1 wherein the polyolefin is polyethylene.
3. The degradable film of claim 1 wherein the polyolefin is polypropylene.

4. The degradable film of claim 1 wherein the transparent film consists essentially of a polyolefin and from about 1 to about 50% by weight of the polyolefin of an additive capable of promoting degradation of the transparent film at a controllable rate upon exposure to outdoor weathering.

5. The degradable film of claim 4 wherein the additive is a polyterpene resin.

References Cited

UNITED STATES PATENTS

| | | | |
|---|---|---|---|
| 1,372,997 | 3/1921 | Eckart | 47—9 |
| 2,369,471 | 2/1945 | Niemeijer | 47—9 |
| 2,453,644 | 11/1948 | Steinkraus | 260—28.5 |
| 2,612,480 | 9/1952 | May | 260—4 |
| 2,876,067 | 3/1959 | Nagel et al. | 117—138.8 |
| 2,894,925 | 7/1959 | Morris et al. | 260—28.5 |
| 2,917,402 | 12/1959 | Sapper | 117—33.3 |
| 3,252,250 | 5/1966 | Lamaire | 47—9 |
| 3,274,731 | 9/1966 | Vigneault et al. | 47—9 |
| 3,278,646 | 10/1966 | Lambert | 260—897 |

WILLIAM D. MARTIN, *Primary Examiner.*

ABRAHAM G. STONE, R. HUSACK, R. E. BAGWILL,
*Assistant Examiners.*